(12) United States Patent
Simmons et al.

(10) Patent No.: US 9,109,874 B2
(45) Date of Patent: Aug. 18, 2015

(54) MODULAR, SIX-AXIS-ADJUSTABLE, CONCRETE-POUR FORM-STRUCTURE SYSTEM

(71) Applicant: ConXtech, Inc., Hayward, CA (US)

(72) Inventors: Robert J. Simmons, Hayward, CA (US); Maxwell C. Simmons, Hayward, CA (US)

(73) Assignee: ConXtech, Inc., Hayward, CA (US)

( * ) Notice: Subject to any disclaimer, the term of this patent is extended or adjusted under 35 U.S.C. 154(b) by 205 days.

(21) Appl. No.: 13/730,949

(22) Filed: Dec. 29, 2012

(65) Prior Publication Data

US 2014/0183330 A1    Jul. 3, 2014

(51) Int. Cl.
*G01B 3/14* (2006.01)
*G01B 3/30* (2006.01)
*G01B 5/14* (2006.01)

(52) U.S. Cl.
CPC .. *G01B 3/14* (2013.01); *G01B 3/30* (2013.01); *G01B 5/14* (2013.01)

(58) Field of Classification Search
CPC ............... G01B 3/14; G01B 3/30; G01B 5/14
USPC ......... 52/294, 295, 296, 299, 741.15; 249/34; 33/624, 625, 644, 645, 562, 533, 613
See application file for complete search history.

(56) References Cited

U.S. PATENT DOCUMENTS

| | | | |
|---|---|---|---|
| 835,059 A | 11/1906 | Curley et al. | |
| 925,677 A | 6/1909 | Belcher | |
| 1,110,185 A | 9/1914 | Brown et al. | |
| 1,367,044 A | 2/1921 | Hausler | |
| 1,400,066 A | 12/1921 | Huck | |
| 1,471,094 A | 10/1923 | Bloss | |

(Continued)

FOREIGN PATENT DOCUMENTS

| | | |
|---|---|---|
| DE | 2758992 A1 | 7/1979 |
| DE | 102009050139 A1 | 4/2011 |

(Continued)

OTHER PUBLICATIONS

ConXtech. 'ConX Modular Pipe Rack' [online]. Jan. 6, 2013. Retrieved from the internet: <http://www.conxtech.com/conx-system/conx-modular-pipe-rack/>; p. 1, figure 1, paragraphs 1, 2; p. 2, paragraph 1. 3pp.

(Continued)

*Primary Examiner* — Michael Safavi
(74) *Attorney, Agent, or Firm* — Kolisch Hartwell, P.C.

(57) ABSTRACT

A precision fabrication form system for preparing a poured-concrete (with upwardly projecting anchor bolts) footing for anchorably supporting the base of an elongate, upright, structural-frame column. The system includes a reversibly stackable plurality of independent, intercooperative, fabrication-form templates—grade, pedestal, base-plate, anchor-bolt and centerline—reversibly assembleable in a predetermined stack order above a prepared ground excavation into which concrete pouring to be associated with such a footing is to occur, certain ones of these templates being infinitely adjustable relative to one another and to the ground in both pre-pour and post-pour conditions to accommodate staged, precision, X-axis, Y-axis, Z-axis, and pitch, roll and yaw axes dispositions for the concrete and anchor bolts in such a footing.

6 Claims, 6 Drawing Sheets

(56) References Cited

U.S. PATENT DOCUMENTS

Figure 12:
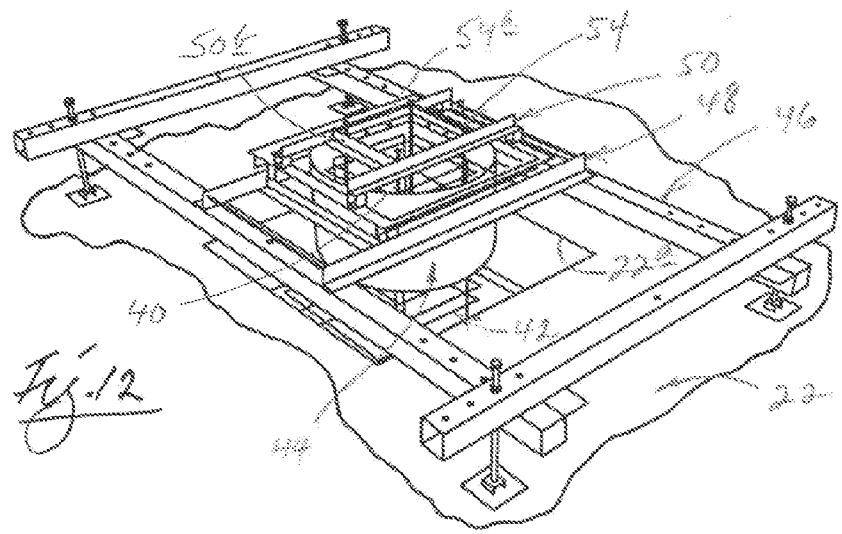

| | | | |
|---|---|---|---|
| 1,729,743 A | 5/1927 | Jorgensen et al. | |
| 2,008,087 A | 7/1935 | Stromberg | |
| 2,569,653 A | 10/1951 | Boedecker | |
| 3,071,205 A | 1/1963 | Becks, Jr. | |
| 3,148,477 A | 9/1964 | Bjorn et al. | |
| 3,270,997 A | 9/1966 | Gethmann | |
| 3,396,499 A | 8/1968 | Biffani | |
| 3,401,739 A | 9/1968 | Opletal | |
| 3,410,044 A | 11/1968 | Moog | |
| 3,533,592 A | 10/1970 | Jennings | |
| 3,562,988 A | 2/1971 | Gregoire | |
| 3,664,011 A | 5/1972 | Labastrou | |
| 3,685,866 A | 8/1972 | Patenaude | |
| 3,706,169 A | 12/1972 | Rensch | |
| 3,784,151 A | 1/1974 | Steele | |
| 3,829,999 A | 8/1974 | Bernstein | |
| 3,977,801 A | 8/1976 | Murphy | |
| 4,019,298 A | 4/1977 | Johnson, IV | |
| 4,059,931 A | 11/1977 | Mongan | |
| 4,306,397 A * | 12/1981 | Ramseyer | 52/295 |
| 4,438,607 A * | 3/1984 | Nelson | 52/126.1 |
| 4,577,449 A | 3/1986 | Celli | |
| 4,684,285 A | 8/1987 | Cable | |
| 4,736,554 A * | 4/1988 | Tyler | 52/105 |
| 4,742,665 A | 5/1988 | Baierl | |
| 4,754,712 A | 7/1988 | Olson et al. | |
| 4,821,844 A | 4/1989 | Huffman et al. | |
| 4,830,144 A | 5/1989 | Werner | |
| 4,852,501 A | 8/1989 | Olson et al. | |
| 4,905,436 A | 3/1990 | Matsuo et al. | |
| 5,061,111 A | 10/1991 | Hosokawa | |
| 5,240,089 A | 8/1993 | Spera | |
| 5,244,300 A | 9/1993 | Perriera et al. | |
| 5,289,665 A | 3/1994 | Higgins | |
| 5,342,138 A | 8/1994 | Saito et al. | |
| 5,590,974 A | 1/1997 | Yang | |
| 5,605,410 A | 2/1997 | Pantev | |
| 5,617,931 A | 4/1997 | Zygmun et al. | |
| 5,678,375 A | 10/1997 | Juola | |
| 6,082,070 A | 7/2000 | Jen | |
| 6,092,347 A | 7/2000 | Hou | |
| 6,106,186 A | 8/2000 | Taipale et al. | |
| 6,219,989 B1 | 4/2001 | Tumura | |
| 6,390,719 B1 | 5/2002 | Chan | |
| 6,554,102 B2 | 4/2003 | Schworer | |
| 6,651,393 B2 | 11/2003 | Don et al. | |
| 6,802,169 B2 | 10/2004 | Simmons | |
| 6,837,016 B2 | 1/2005 | Simmons et al. | |
| 6,913,422 B2 | 7/2005 | Rogers | |
| 7,021,020 B2 | 4/2006 | Simmons et al. | |
| 7,032,712 B2 | 4/2006 | Schworer | |
| 7,082,694 B2 * | 8/2006 | Lyman, Jr. | 33/670 |
| 7,469,485 B1 * | 12/2008 | Perdue | 33/562 |
| 7,677,522 B2 * | 3/2010 | Bakos | 248/500 |
| 8,011,150 B2 | 9/2011 | Luttrell et al. | |
| 8,056,299 B2 * | 11/2011 | Liskey | 52/742.14 |
| 8,132,774 B1 * | 3/2012 | Whatcott | 249/4 |
| 8,161,698 B2 * | 4/2012 | Migliore | 52/295 |
| 8,161,707 B2 | 4/2012 | Simmons | |
| 8,297,002 B2 | 10/2012 | Fernández Fernández | |
| 8,522,507 B2 * | 9/2013 | Asada et al. | 52/742.14 |
| 8,528,298 B2 * | 9/2013 | Semaan et al. | 52/745.17 |
| 8,627,615 B2 * | 1/2014 | Moyher | 52/169.5 |
| 8,646,232 B2 * | 2/2014 | Liskey | 52/295 |
| 2004/0237439 A1 | 12/2004 | Powell | |
| 2005/0066612 A1 | 3/2005 | Simmons | |
| 2007/0256391 A1 | 11/2007 | Mifsud et al. | |
| 2008/0245023 A1 | 10/2008 | Simmons | |
| 2009/0052980 A1 | 2/2009 | Williams | |
| 2012/0110947 A1 | 5/2012 | Simmons | |
| 2012/0160137 A1 | 6/2012 | Linares | |
| 2012/0292131 A1 | 11/2012 | Lovas | |
| 2013/0319796 A1 | 12/2013 | Davis | |

FOREIGN PATENT DOCUMENTS

| | | |
|---|---|---|
| FR | 2471461 A1 | 6/1981 |
| FR | 2613403 A1 | 10/1988 |
| GB | 1204327 A | 9/1970 |
| GB | 2261651 A | 5/1993 |
| JP | 2011-22001 | 1/1999 |
| JP | 2000-110236 | 4/2000 |
| WO | WO 98/36134 | 8/1998 |
| WO | 2011047830 A1 | 4/2011 |

OTHER PUBLICATIONS

ConXtech Brochure. 'CONX Modular Pipe Rack' [online]. Apr. 16, 2014. Retrieved from the internet: <http://www.conxtech.com_wp-content_uploads_files_documents_ConX_Modular_Pipe_Rack_Brochure.pdf>; entire document. 25pp.

U.S. Patent and Trademark Office, Office action regarding U.S. Appl. No. 14/163,778, dated Oct. 1, 2014, 29 pages.

U.S. Patent and Trademark Office, Office action regarding U.S. Appl. No. 14/160,797, Aug. 18, 2014, 24 pages.

* cited by examiner

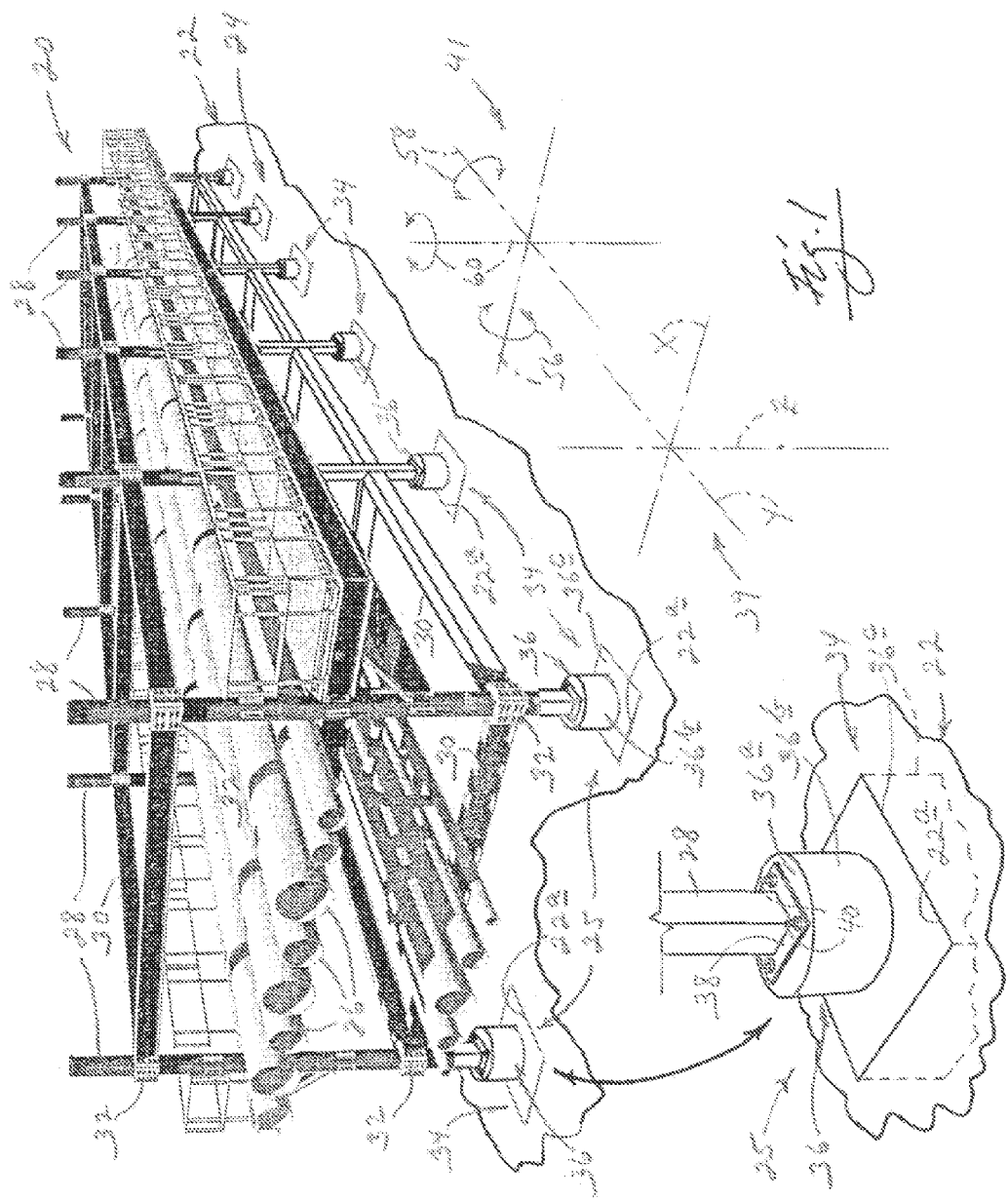

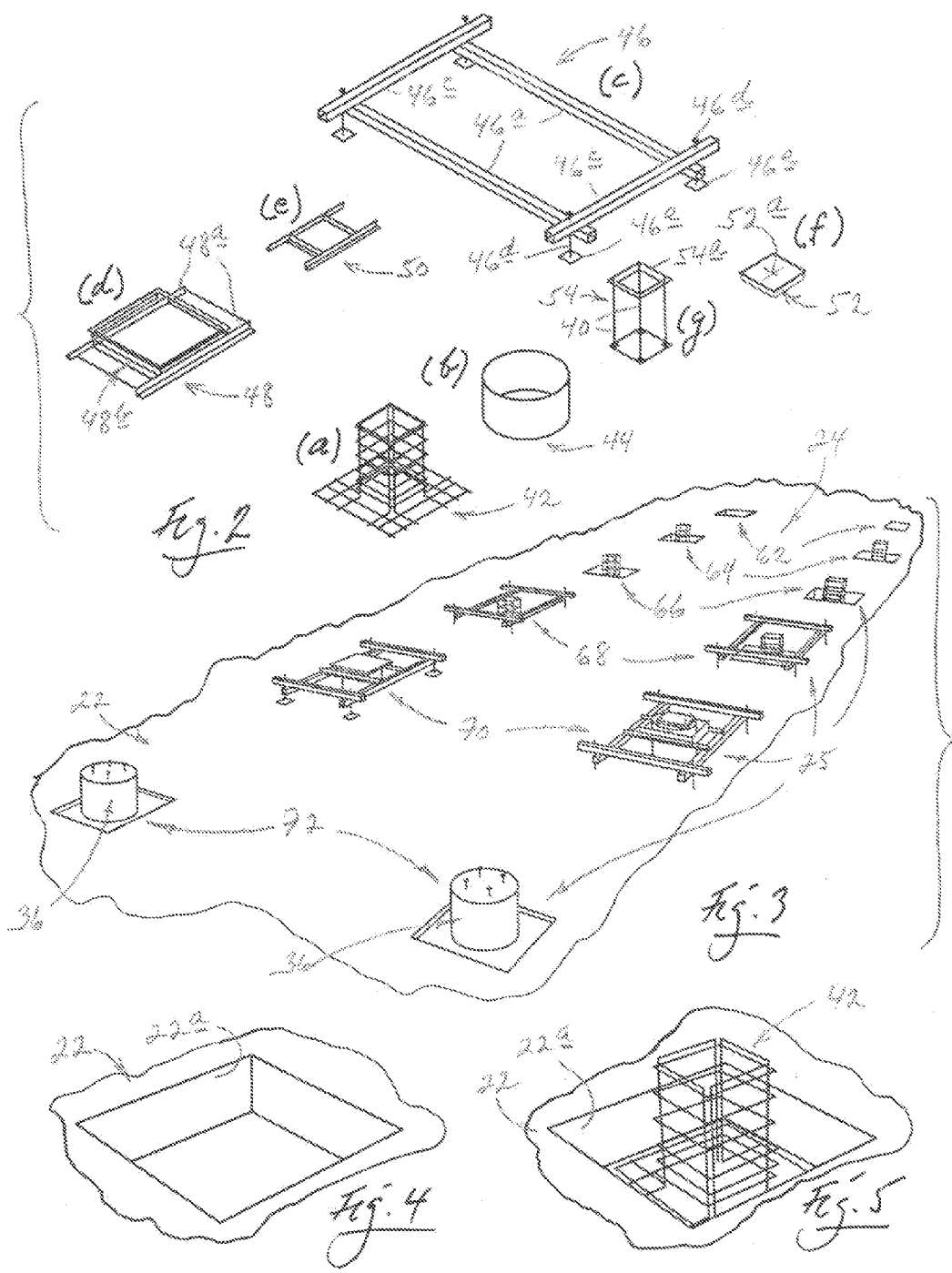

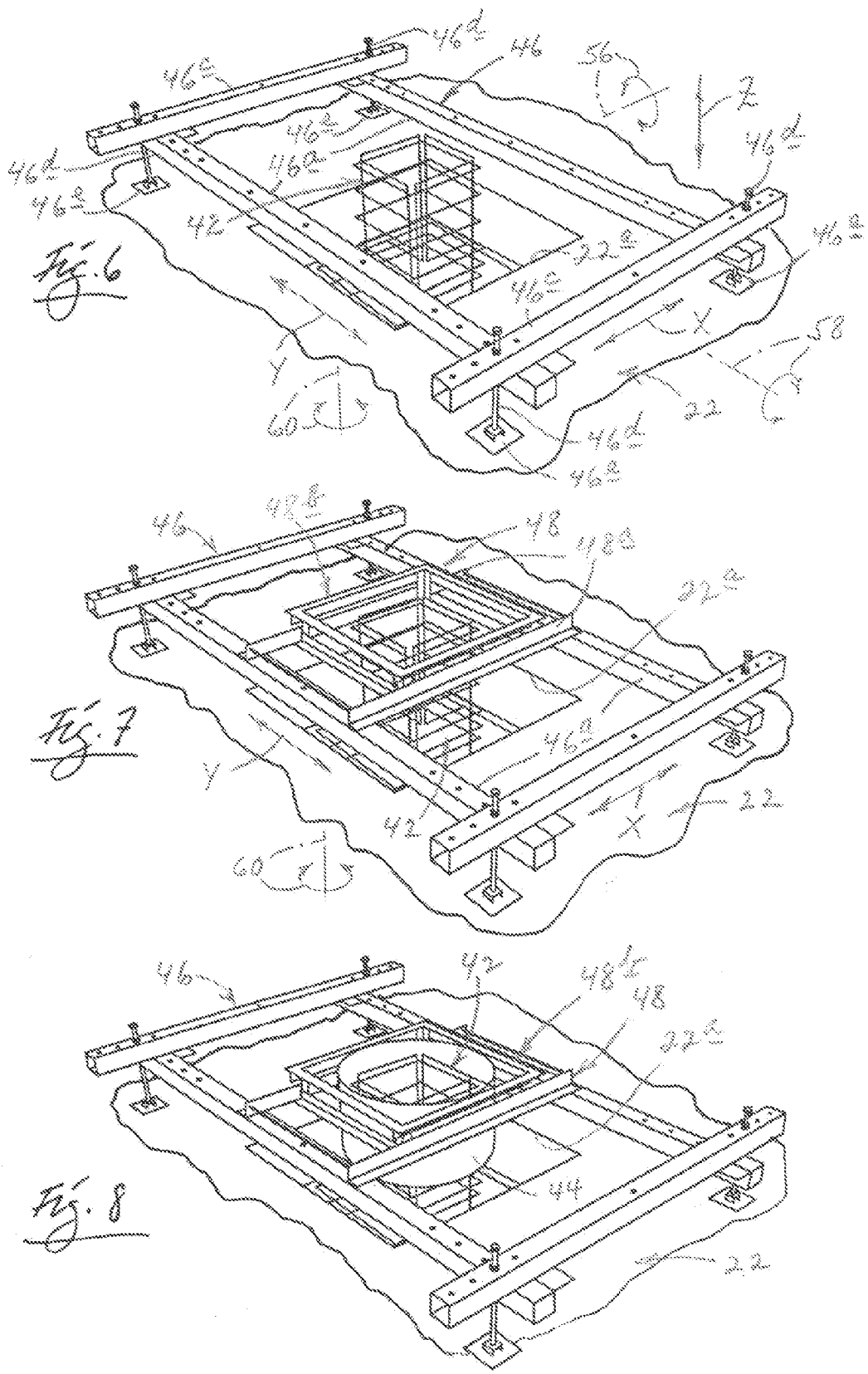

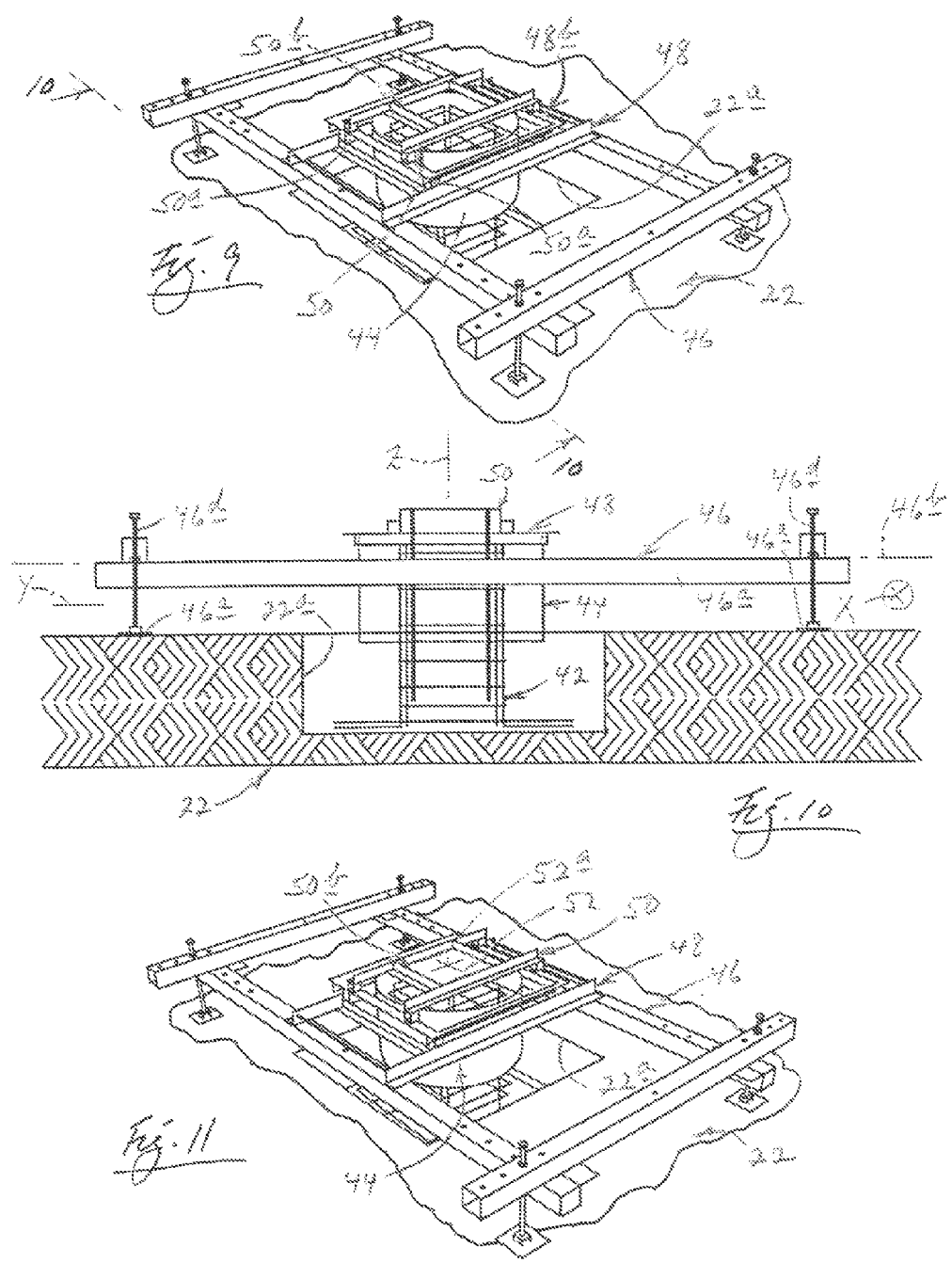

MODULAR, SIX-AXIS-ADJUSTABLE, CONCRETE-POUR FORM-STRUCTURE SYSTEM

BACKGROUND AND SUMMARY OF THE INVENTION

This invention pertains to a multi-axis-adjustable, high-precision form system for assisting in the fabrication of poured-concrete, ground-support footings, or pedestals, intended for supporting the lower ends (the bases) of elongate upright columns, such as columns that are to be, or may be, included in a structural frame which is to be defined by an array of plural, distributed, upright columns interconnected by transverse beams. The terms "footing" and "pedestal" are used herein interchangeably.

In a more specific sense, the invention proposes a high-precision adjustability footing-fabrication form system which features independent, six-axis, form-template adjustability—three linear, and three rotational—and which employs, for each footing that is to be fabricated, a vertically, reversibly stackable plurality of relatively simple-configuration, independent, intercooperative form templates that are freely reversibly assembleable in a predetermined, vertical stack order designed to accommodate convenient and accurate, poured-concrete footing fabrication, and that offer versatile, relative-motion (including (a) within footing site template-to-template, and (b) footing-site-form-assembly-to-footing-site-form-assembly), infinitely positionable, spatial-disposition adjustability features regarding the mentioned linear (namely, X, Y and Z), and rotational (namely, pitch, roll and yaw), axes.

While, as will become apparent to those generally skilled in the relevant art, from a reading of the invention description which follows below herein, the form system of the present invention may be employed in the number of different column-support applications, it has been found to offer particularly utility in relation to assisting in the formation of poured-concrete anchoring footings/pedestals prepared for the bases of columns that are to be employed in open, column-and-beam frame structures designed to receive and support plural, elongate, horizontal runs of pipe that may extend for long distances over and above the ground in large oil and/or gas facilities. Accordingly, the preferred and best mode embodiment of the invention is illustrated and described herein generally in such a setting.

While various different, specific shapes of column-support footings may readily be handled by the form system of the present invention, the preferred and best mode embodiment of it which is set forth herein is presented, for illustration purposes, in relation to a footing style that includes a rebar-reinforced, stepped-lateral-dimension (larger-lateral-dimension, rectangular-block lower-section, and smaller-lateral-dimension (diametral), cylindrical, upper-section), poured-concrete base, from the upper, flat, essentially horizontal and circular surface of which upper base section there project plural, upwardly extending anchoring bolts to which appropriate lower-end-attached, column-base anchoring structure for an upright column may be secured.

Further describing, generally, certain features that are offered by the system of the present invention, the plural-form-template arrangement (mentioned above) which is employed during the creation of each footing is intended, through affording a capability for implementing the featured high-precision spatial adjustability of the invention, to enable, among other things, precise spatial-disposition formation and alignment associated with arranging a plurality of footings distributed in a planned array thereof intended to receive and support a planned population of columns, such as the above-mentioned array-plurality of structural-frame columns. In such a "column-plurality-array" context, and with respect to the important feature of precision spatial adjustability, the various templates which form part of the system of the present invention are relationally designed, as will be described below herein, to accommodate, in a "fine-tuning" manner, the mentioned six axes of independent adjustability, i.e., linear adjustability along X, Y, and Z axes, and rotational adjustability about appropriate pitch, roll and yaw axes. This important, fine-tuning precision adjustability feature—which I recognize to be very useful in many frame-column-support applications—is especially useful in the context of preparing footings that are to be employed as column-base supports in relation to the fabrication/assembly of a structural frame from initially precision-manufactured column, beam and associated column/beam nodal-interconnect frame elements, such as those kinds of structural-frame elements which are illustrated and described in U.S. Pat. Nos. 6,837,016, 7,021,020, U.S. Patent Application Publication No. 201210110947, and U.S. Patent Application Publication No. 2005/0066612.

So as to augment the herein provided, specific description and illustration of the present invention, the entire disclosure contents of these, four, prior-art documents are hereby incorporated herein by reference.

In accordance, therefore, with a preferred and best-mode embodiment of the invention, and discussed from one point of view, the invention offers a precision fabrication form system for assisting in preparing a poured-concrete (base)—with upwardly projecting anchor bolts—footing for anchorably supporting the lower end of an elongate, upright, structural-frame column—this system including a reversibly stackable plurality of independent, intercooperative, fabrication-form templates that are reversibly assembleable in a predetermined stack order above a prepared ground excavation into which concrete pouring to be associated with such a footing is to occur, with certain ones of these form templates being infinitely adjustable relative to one another, and relative to the ground, in both pre-pour and post-pour conditions, to accommodate staged, high-precision, X-axis, Y-axis, Z-axis, and pitch, roll and yaw axes, dispositions for the poured-concrete base and anchor bolts in such a footing. In the invention system descriptions that are presented below herein, and while the following axial relationships do not necessarily need to be the case, the X-axis parallels the pitch-axis, the Y-axis parallels the roll-axis, and the Z-axis parallels the yaw-axis.

What may be thought of herein as the several, "relative adjustability" form templates include:

(a) a grade template restable on the ground immediately above, adjacent, and laterally surrounding a prepared ground excavation, defining a generally horizontal support plane, and constructed for selective, independent, X-axis, Y-axis, Z-axis, pitch-axis and roll-axis adjustments relative to the ground and to such a prepared excavation, as well as to adjacent footing sites;

(b) a pedestal template anchorably supportable in a vertically stacked manner on the grade template's defined support plane, adapted to receive and support a pedestal, upper-base-section, pour form (generally cylindrical herein), and adjustable independently and selectively along X, Y axes, and about a yaw axis, relative to the grade template;

(c) a base-plate template supportable in a vertically stacked manner on the pedestal template, adapted to receive and support, in a vertically stacked manner, an anchor-bolt template, and (d) an anchor-bolt template placeable in a freely vertically received condition relative to the base-plate template.

The form templates further include a temporary and intermediate-use centerline template which is freely placeable, in a vertically stacked, and removeably nested, condition, on the base-plate template as a removable precursor to placement, relative to the base-plate template, of the anchor-bolt template.

Yet another way of visualizing the invention is that it proposes a precision, poured-concrete, column-ground-support footing-fabrication form system, for assisting in preparing, at each of a plurality of spaced, column-support ground sites distributed in a predetermined-footprint ground array of such sites, a footing for anchorably supporting the lower end of an elongate, upright, structural-frame column which is to be included in a plural-column, plural-interconnecting-beam, structural frame constructed within the array footprint, wherein each footing includes a concrete base and plural anchor bolts projecting upwardly therefrom, and precision fabrication utilizing the system is enabled via system structure designed to accommodate precision, independent, X, Y, Z, pitch, roll and yaw axes spatial positioning of the base and anchor bolts associated with each such footing.

These and various other features and advantages that are offered by the present invention will become more fully apparent as the detailed description of it which follows below is read in conjunction with the accompanying drawings.

DESCRIPTIONS OF THE DRAWINGS

FIG. 1 illustrates, in perspective, (a) a portion of an open, elongate, rack-style, column-and-beam structural frame designed to hold, as shown, plural lengths of elongate pipe. (b) an enlarged, isolated, fragmentary detail of a column-base footing-support region disposed adjacent the base of one of the columns in this frame, and (c) a pair of spatial representations of linear and rotational, precision-adjustment axes that relate to precision-orientation-and-placement fabrication of poured-concrete footings for the columns in the pictured frame.

The lower ends of the columns, as seen in this figure, are anchored to the tops of per-column, precision-fabricated, poured-concrete-and-anchor-bolt footings that have been fabricated in accordance with, and utilizing the high-precision fabrication form system featured in, practice of the present invention. Specifically, these lower column ends, which have appropriate foot plates (seen in this drawing figure) welded to them, are secured through these foot plates via tightened-nut attachments made to upwardly extending anchor bolts that are included in the footings In the enlarged detail which forms part of FIG. 1, one can see both the above-ground and the below-ground sections of what has been referred to above as the stepped-lateral-dimension, poured-concrete base in one of the prepared column-support footings. These two, footing-base sections are illustrated (at least fragmentarily for the lower section) in a combination of solid and dashed (underground) lines. These footing-base sections are here seen to include a larger-lateral-dimension, rectangular-block, below-ground, lower section, from the upper side of which projects a smaller-lateral-dimension, (diametral) cylindrical, above-ground upper section. Partially concrete-embedded, column-base, anchoring bolts project upwardly from the circular upper surface of the upper base section.

FIGS. 2*a-g*, inclusive, illustrate, in a component-separated manner, (a) the several, independent, individual, stackable, intercooperative, fabrication-form templates that are featured by the present invention, and that are employed to facilitate fabrication of poured-concrete footings, such as those appearing in FIG. 1, and (b) certain other footing-fabrication-related components which play roles in the fabrications and structures of such footings.

FIG. 3 is a stylized, schematic, perspective illustration picturing, in a distributed fashion, progressive stages in the fabrication of column-support footings based upon utilization of the system and practice of the present invention. "Earlier-stage to later-stage" footing fabrication conditions are presented in a manner in FIG. 3 "stage-progressing" toward the viewer of this figure.

Large, side brackets that are presented in FIGS. 2 and 3 visually "capture" and indicate the respective, intended, "collected" contents of these two figures.

FIGS. 4-17, inclusive, illustrate, each in perspective, except for FIG. 10, a sequence, or succession, of poured-concrete footing-fabrication steps performed utilizing the system of the present invention. More specifically: FIG. 4 illustrates a within-ground excavation, square-rectilinear in nature, prepared to receive a poured-concrete footing base: FIG. 5 illustrates placement of a suitably prepared pedestal rebar assembly in the excavation of FIG. 4; FIGS. 6-9, inclusive, illustrate, respectively, placement, for fabrication assistance, of four, independent, vertically stackable form templates that are featured in the system of the invention, along (in FIG. 8) with a cylindrical, pedestal-upper-base-section, concrete-pour-receiving form, with the four illustrated templates being presented in the order, respectively, of a grade template, a pedestal template, a base-plate template, and an anchor-bolt template; FIG. 10, which is drawn on a scale larger than that employed in FIG. 9, presents a view taken generally along the line 10-10 in FIG. 9; and FIGS. 11-17, inclusive, illustrate successive stages of completion of fabrication of a poured-concrete footing, including progressive removal of the mentioned system form templates

DETAILED DESCRIPTION OF THE INVENTION

Turning attention now to the drawings, and referring first of all to FIG. 1, indicated generally at 20 is a fragmentary portion of an open, rack-style, precision-fabricated, structural, column-and-beam frame extending over the ground, shown at 22, in relation to a predetermined, planned-footprint, plural-column array 24 of ground sites, such as ground sites 25—this frame being designed to support runs of elongate gas, oil, or other pipelines, such as the pipelines generally shown herein at 26. Included in frame 20, which, for illustration purposes herein, has been made in accordance with the precision frame-fabrication approaches and components mentioned in the above-identified patents and published patent applications (whose full disclosures have been incorporated herein by reference), are plural, elongate, upright columns, such as columns 28, interconnected in the frame at different, common levels above the ground by horizontal beams, such as beams 30. These columns and beams join one another through precisely constructed, full-moment nodal connections, or nodal connection structures, 32 that have also been made in accordance with the referenced patent and patent-application disclosures. While illustrations of only a few of these connection structures 32 have been included in FIG. 1, in order to simplify, somewhat, this drawing figure, it should be understood that they are present at every column-beam intersection.

Columns 28 are distributed over the ground in array 24 in a predetermined, designed, "row-and-column" pattern for frame 20. The lower ends, or bases, of these columns are effectively "anchored to the ground" at appropriately distributed and positioned anchor sites, such as anchor sites 34, through poured-concrete footings, or pedestals, 36 that reside, supported, in appropriately and respectively prepared, generally laterally square "footprint", ground site excavations, such as excavations 22*a*, and column-attached, column foot plates 38 which sit on the tops of these footings. More specifically, plates 38 are anchored to the upper and upwardly facing, circular, horizontal surfaces 36*a* of the upper base sections 36*b* included in footings 36, which footings have been fabricated utilizing the preferred and best-mode embodiment of the high-precision, multi-axis adjustable, plural-template form system constructed in accordance with the present invention—the structural features of which system will be described shortly.

As will become apparent, and while those skilled in the art recognize that poured-concrete footings for supporting columns may take on a number of different specific configurations, the present invention is illustrated herein in conjunction with the fabrication of footings that have a configuration each including what may be thought of as a stepped-lateral-dimension (i.e., possessing both (a) larger-lateral-dimension, and (b), connected smaller-lateral-dimension sections), poured-concrete base possessing a rectangular-block-shaped lower section 36*c* (defined by the above-described ground site excavations 22*a*) having the larger lateral dimensions in the base, from the upper side of which lower section projects an upper, cylindrical section 36*b* (generally mentioned just above) having the smaller-lateral-dimensions (a single, diametral dimension) in the base, with four, footing-included, partially concrete-embedded, column-foot-plate anchor, or anchoring, bolts 40 projecting upwardly from the previously mentioned, circular, upper surface 36*a* of the upper base section.

To be noted especially at this point, is that the form system of the present invention, which offers the above-mentioned, high-precision adjustability features (still to be more fully described) that allow for precision fabrication and alignment of footings 36, accommodates quick, precise and convenient assembly of precision-fabricated frame 20. Precision adjustability of this form system is, as will become apparent to those skilled in the art, an important footing-fabrication offering of this invention under all circumstances, i.e., notwithstanding the precision nature, or not, of the ultimate assembly above of a column-supported structural frame. As will be more fully discussed later herein, six-axis, precision adjustability performed during footing fabrication, in accordance with use of the form system of the present invention, is performed in relation to each of the two, commonly aligned, orthogonal axis systems shown in FIG. 1 generally at 39 (linear) and 41 (rotational).

With attention addressed generally now to the various system and associated, other components that are presented in FIGS. 2*a-g*: the component shown at a is a conventionally assembled, appropriately shaped pedestal rebar structure 42 which is employed as an embedded, reinforcing, core armature in the poured-concrete base for a pedestal/footing: the component shown at b is a double-open-ended, cylindrical pedestal pour form 44, made, for example, of any suitable flexible material, such as a flexible plastic material, which form, during pedestal fabrication, circumsurrounds the upper portion of the just-above-described pedestal rebar structure to define, and accommodate the pour-formation of, the generally cylindrical, smaller-lateral-dimension, upper section 36*b* of a pedestal/footing base; the component pictured at c is a grade template 46 which forms a lower part of the form structure of the present invention, and which includes spaced, substantially parallel, elongate rails 46*a* that define what is referred to herein as a support plane 46*b* which is illustrated, only in FIG. 10, fragmentarily by a dash-dot line; the component illustrated at d is a pedestal template 48 which is designed to sit, as will shortly be described, on the grade template's defined support plane 46*b*, and which also forms part of the form structure of the present invention; the component appearing at e is a base-plate template 50—also a component which forms part of the form structure of the invention, and specifically a part which is designed to be supported, as will be explained below, on top of the pedestal template; and the components shown at f and g—also components that are parts of the form structure of the present invention—are, respectively, f, a temporarily, and intermediately, employable, flat-plate, square, centerline template 52, which includes a central, orthogonal-crossed line-pair mark, or cross-mark, 52*a*, adapted to be removeably and nestably received, for a short period of time, within a complementary receiving portion which is provided on top of the base-plate template, and g, an anchor-bolt template 54 having an open, square, upper portion 54*a* which is adapted also to be removeably and nestably, complementarily seated, as will later be explained, at the same location just mentioned on top of the base-plate template following removal therefrom of the earlier, temporarily employed centerline template.

For a reason which will be explained later, upper square portion 54*a* in anchor-bolt template 54 is temporarily attached, adjacent its four corners, by pairs of later-discardable, upper and lower, removable clamping bolts (not specifically illustrated), to four (a number chosen for illustration herein), elongate, downwardly extending, threaded, and previously mentioned anchor bolts 40, the upper ends of which project slightly above portion 54*a* through upwardly facing, "corner-prepared" (in template portion 54*a* and not specifically illustrated), clearance holes.

Templates 46, 48, 50, 52, 54, as just indicated above in other words, collectively make up the precision-fabrication form system of the present invention. These templates are also referred to herein together as a reversibly stackable (in a defined stack order) and assembleable plurality of independent, intercooperative, fabrication-form templates.

As will become more fully evident to those skilled in the art from viewing FIGS. 4-16, inclusive, herein, the several, differently configured templates just mentioned in relation to FIG. 2, which templates essentially define the totality of the form structure of the present invention, are suitably made, variously, from conventionally available (preferably steel) angle-iron stock, flat bar and plate stock, rectangular-tubular cross-section stock, etc., with these conventional stock materials appropriately joined, as by welding, to have the appropriate shapes and sizes suitable for practice of the invention. Another matter regarding these template structures which will be appreciated by those generally skilled in the relevant art is that their respective sizes may be chosen appropriately to accommodate different footing-fabrication applications, and to relate them, in size, one-to-another, so that they will function correctly during high-precision-adjustability footing fabrication. In these respects, regarding the structures of the form templates just described and seen in FIG. 2, it should be noted that the precise details of these template components, except insofar as they need to relate to one another as described and illustrated herein, are not critical, and do not form any part of the present invention.

More about these templates, including further details regarding their respective constructions and functional features, and about the form system of the present invention which they collectively and collaboratively define, is now presented in relation (1) to the "earlier-stage to later-stage" footing-fabrication conditions that are presented collectively in a unified, perspective fashion in FIG. 3, and there in a manner, as expressed above, "stage-progressing" in this figure toward the viewer, and (2) to step-by-step, "system-in-use" discussions focusing on what is pictured step-sequentially in FIGS. 4-17, inclusive. FIGS. 4-17, inclusive, fully illustrate how, via employment of the form system of the invention, the included form templates, in a defined order of stacking, and eventual unstacking, function to assist in the fabrication of a poured-concrete (with upwardly projecting/extending anchor bolts) column-base support footing.

FIG. 4, viewed along with FIG. 10 (and to some extent, with FIGS. 3-9, inclusive, and FIGS. 11-17, inclusive), illustrates, in a drawing-shape-idealized way, one of the previously-referred-to ground-site excavations 22a, dug, during a preliminary footing-fabrication step, which is the specific step pictured in FIG. 4, to have a suitable depth, and herein an appropriately sized, square, lateral footprint, as determined by the planner(s) of frame structure 20 in relation to load-carrying requirements for this frame. The lateral and depth dimensions of site excavation 22a are determined in accordance with the particular frame-design application, and do not form any part of the present invention. As was mentioned earlier herein, and as will become apparent from descriptive text which follows below, each excavation site 22a effectively defines the shape and size of the larger-dimension, lower base section 36c in each footing 36.

FIG. 5 pictures the next footing-fabrication step which involves the insertion into excavation 22a of previously described pedestal rebar structure 42. With reference made to FIG. 10 along with FIG. 5, the herein, designer-selected, relative vertical dimensions of this rebar structure and of the depth of site excavation 22a are clearly seen. This relationship, of course, is one of designer choice, with the upwardly extending size of the pedestal rebar structure designed to function appropriately as a central, core armature for a poured-concrete pedestal base. The upper reaches of the rebar structure will, of course, extend embeddedly within the upper, smaller lateral dimension (herein diameter) cylindrical section 36b of a footing 36.

FIG. 6 pictures placement on the ground, above, adjacent, and surrounding what is shown in FIG. 5, of a grade template 46. This template, which herein is rectangular in "footprint" configuration, and here, one should also consult FIG. 10, in addition to including previously mentioned, spaced, elongate and substantially parallel rails 46a that define previously mentioned support plane 46b, additionally includes elongate, spaced, upper cross rails 46c which parallel one another and which are affixed, as by welding, to the upper surfaces, and adjacent the opposite ends, of rails 46a, as can be seen. Adjustably and threadedly attached in a manner extending threadedly through, and adjacent, opposite ends of rails 46c, laterally outwardly of the opposite ends of rails 46a, are elongate, generally vertical, threaded, screw-adjustable legs, such as legs 46d, the lower ends of which, positioned below rails 46a, 46c, carry ground-engaging feet, or pads, such as pads 46e.

FIG. 6 further illustrates, comprehensively, in relation to the therein pictured, single site excavation (and see also FIG. 1, and FIG. 3 with respect to array 24 which includes, as seen there in FIG. 3, plural, array-related site excavations) the relevant, precision-adjustment X, Y and Z linear axes—shown by double-ended, linear arrows labeled X, Y and Z—and additionally, the relevant, precision-adjustment pitch, roll and yaw rotational axes, which rotational axes are shown, respectively, both by dash-dot axis lines, and by double-ended, curved, rotational-directions arrows, 56, 58, 60. Presentations of one or more of these axes in other drawing views herein are limited to illustrating there the specific precision adjustment, or adjustments, and the associated precision-adjustment axis, or axes, best related to these other views. FIG. 1, as mentioned earlier, includes a presentation of all six of these axes.

A grade template, such as template 46 will typically be put into place with what may be thought of as simply "eyeballed", but not precision, though nevertheless "closely proper", X, Y and Z orientations within a column-plurality-array, such as array 24. As will become apparent, such less-than-precision, X, Y and Z "eyeballing" associated with a grade-frame positioning relative to a site excavation is all that is necessary in the practice of the present invention with regard to how a grade template is initially put into place. However, in other ways beyond especially such X and Y, general eyeball positioning, the grade template form ultimately furnishes, essentially via defined support plane 46b, several of the important, independent, precision-adjustability features that characterize the form-template system of the invention, and specifically furnishes precision pitch-axis, roll-axis and Z-axis adjustability.

Accordingly, in preparing, relative to what is pictured in FIG. 6, for ultimate, final concrete-pouring footing fabrication, and as will be more fully explained later herein, appropriate precision screw adjustments are made in legs 46d and their carried foot pads 46e to adjust for proper pitch, roll and Z axes dispositions for the associated grade template, and in particular, for the grade template's defined support plane 46b, and thereby for other, overhead-supported templates, relative to the ground and to the associated site excavation, and additionally for the in-place pedestal rebar structure. Any appropriate, conventional precision leveling, angling, aligning, etc. technique(s), such as those employing surveying transits, and other surveying-quality devices, such as laser-beam devices, may be employed at the appropriate time(s) to establish suitable, confirmed "end points" for such precision, pitch-, roll-, and Z-axis adjustments.

FIG. 7 illustrates the next step involved in the employment of the template system of the present invention, and specifically pictures placement of pedestal template 48 for limited-range, multi-direction, "in-support-plane-46b" sliding, for precision, independent X-axis, Y-axis and yaw-axis adjustments, on rails 46a in grade template 46. See here also FIG. 10. Template 48, as constructed herein, and as was mentioned briefly above with respect to the constructions, generally, of the several frame components shown in FIG. 2, is formed of plural, suitably joined, elongate, bar- and angle-iron-stock pieces, as seen in FIG. 7 (as well as in FIGS. 2 and 10). It includes spaced, parallel, angle-iron rails 48a that sit slidably, directly and removeably on the top surfaces of rails 46a in the grade template, and thus effectively on support plane 46b, and further includes, suitably joined to and disposed between rails 48a, a central, square-open-box, window assembly 48b having spaced, opposite, parallel sides, and which assembly is designed, as will be described more fully shortly with respect to a later, fabrication-assistance step pictured in FIG. 8, to receive and support, removeably, vertically slidably, and generally freely, one of a cylindrical, concrete-pour, pedestal form 44, such as is seen in FIG. 2.

Regarding the condition described above as limited-range, multi-direction. "in-support-plane-46b" slidable seating of template 48 on template 46, while this condition may be accommodated in a number of different conventional ways, it is enabled herein, in one of these ways, by the provision of an appropriate plurality (such as four) of X-axis-adjustable, Y-axis-adjustable and yaw-axis-adjustable, collaborating pin and pin-receiving-opening arrangements. Such arrangements, which are entirely conventional in nature, and which are not specifically shown or detailed in the present drawings, are provided at appropriate, contact-interface locations between templates 46, 48, and are located, as a collaborating set of such arrangements, relatively centrally regarding the "lateral footprint" of grade template 46. For example, in connection with these non-pictured pin, etc. arrangements, rails 48a herein carry short, downwardly projecting pins that extend, when template 48 is properly seated on template 46, with user-predetermined, all-around clearances through generally vertically aligned, circular openings provided in rails 46a.

These pin, etc. arrangements, as those skilled in the art will clearly recognize, enable limited, in-support-plane-46b slidable motion of the pedestal template initially loosely, and generally centrally, as shown in FIG. 7, on top of rails 46a, with the pin and pin-receiving-opening arrangements then allowing for appropriate, limited, precision X-axis, precision Y-axis, and precision yaw-axis (60) relative sliding motions and angular adjustments to take place between the pedestal template and the underlying grade template, specifically in a manner accommodating precision X-, Y-, and yaw-axis positionings of template 48 relative (a) to the immediately associated site excavation 22a, (b) to its received pedestal rebar structure 42, and (c) to other site excavations 22a in array 24. When such precision adjustments have ultimately been made—adjustments that will be made, and are still to be more fully described, at and in relation to a later fabrication-preparation stage pictured in the drawings, templates 46, 48 are then releasably locked together in any suitable manner, as by conventional, releasable clamping, in order to function as a stabilized, unitary structure during subsequent concrete pouring.

FIG. 8, as was just mentioned briefly above, illustrates a further step in the footing fabrication-assisting practice which is now being described, and specifically shows that a concrete-pour pedestal form 44 has been lowered, slidably and freely, through the square window furnished in the central, square-open-box, window assembly 48b in template 48, to surround an upper portion of pedestal rebar structure 42. Preferably, the inside, transverse dimensions of "square" assembly 48b, i.e., the dimensions existing between the four components which form its opposite, parallel sides, are substantially equal, and just slightly greater than the outside diameter of form 44—a condition which accommodates the mentioned free, slidable reception of the pedestal form to have the disposition shown for it relative to templates 46, 48 pictured in FIG. 8. In terms of supporting form 44 effectively by window assembly 48b in the template 48, this is accomplished herein by the provision, at several (such as four) locations adjacent the upper rim of form 44, of small, outwardly projecting tabs (not shown) which come to rest on the upper surfaces existing in the four, component-formed sides of assembly 48b. This arrangement herein positions the top of form 44 at about the level of the top of template 48 (see also FIG. 10).

FIG. 9 in the drawings illustrates what happens next, and namely, that base-plate template 50, which includes four, small, "corner", support feet 50a, becomes appropriately seated via these feet—preferably laterally fixedly and conventionally pin-located through conventional pin-and-hole registry structure (not shown) associated with these feet and with underlying pedestal template 48—on top of two of the opposite side components that form opposite sides of assembly 48b in the pedestal template. In this pin-registered condition, X-axis, Y-axis, and yaw-axis precision adjustments made in pedestal 48 are communicated directly and commonly to the base-plate template.

The four elongate components, clearly seen in FIG. 9, which components make up a portion of the base-plate template, define herein a square, central, upwardly facing, open well structure 50b. This well structure, whose two functions will be described immediately below, resides in a condition spaced somewhat above the top of assembly 48b in pedestal template 48 (here, see also FIG. 10).

The next two stages of pre-concrete pouring fabrication assistance are illustrated, respectively, in FIGS. 11 and 12.

In FIG. 11, with base-plate template 50 in place as just described, centerline template 52 is complementarily and nestably seated in well-structure 50b—this centerline template bearing on its upper surface, the previously mentioned, central, orthogonal-crossed-line-pair mark, or cross-mark, 52a. With the centerline template in place, and using (a) the just-mentioned cross-mark 52a as a central and key datum reference for alignments and adjustments, along with (b) selected, relevant, precision alignment instruments and devices, such as those identified representationally above, all, final, pre-concrete-pouring, precision X-axis, Y-axis, Z-axis, pitch-axis, roll-axis, and yaw-axis adjustments are made. Such adjustments are specifically performed through the making of relative, X, Y, and Z linear, and pitch, roll, and yaw rotational, positional motions accommodated, respectively, and as explained above, (1) by the legs and associated foot pads in grade template 46 to control the disposition in space, and specifically relative to the ground and to a site excavation 22a, of support plane 46b (see again specifically FIG. 10), and thereby to furnish precision pitch-axis, roll-axis and Z-axis adjustments, and (2), relatively between templates 48 and 46 to furnish precision X-axis, Y-axis, and yaw-axis adjustments. These adjustments are made both on (1) a per-footing-site/ground-site basis relative to the site-associated excavation 22a, and (2) as well on an inter-footing-site/inter-ground-site basis within and throughout array 24.

These adjustments fundamentally, and with high precision, correctly position the various components that are shown in FIG. 11 with respect to the ground at that location, and additionally, and considering the fact that before concrete pouring takes place, similar precision adjustments are made at all other ground-site excavations in array 24, prepare all of the relevantly associated pre-pour footing locations with precise, inter-site alignment.

Following the making of such precision adjustments, the centerline template is removed from the base-plate template, and in its place, the anchor bolt template is installed, as illustrated in FIG. 12. As can be seen here, with this anchor-bolt template so-installed, its upper portion 54a seats, complementarily, within the previously mentioned well structure 50b provided in base-plate template 50, with anchor bolts 40 (two of which are shown in this figure) now properly positioned in downwardly extending positions within the confines of pedestal form 44—adjacent the corners of the upper portion of pedestal rebar structure 42.

Thus, in the preparations for assistance in precision footing fabrication, and related concrete pouring to create, in conjunction with anchor bolts 40, an associated, poured-concrete footing base, the vertical stack arrangement, or order, established for uses of the several form templates of the invention, progressing upwardly from the ground, is the grade template, the pedestal template, the base-plate template, the centerline template, and, once the centerline template has served its temporary purpose during precision adjusting and has been removed from the underlying, three-template stack, the anchor-bolt template.

Figure 13:
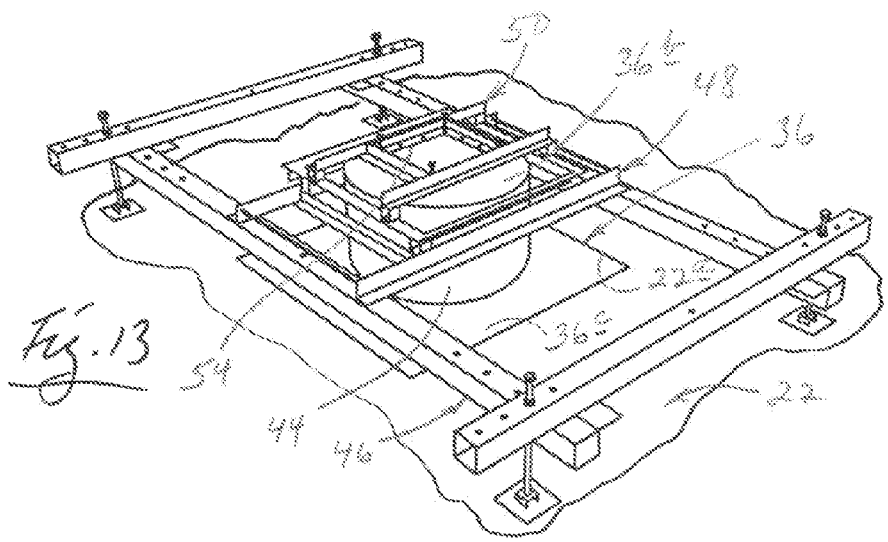

FIG. 13 next illustrates the result of concrete pouring, an action which is readily accommodated by the openness of the assembled template-form structures, with this pouring activity resulting in a poured-concrete footing having the appropriate, rectangular-block-like lower base section 36c, and the appropriate, upper, cylindrical base section 36b. As was suggested earlier herein, the form-template structure of the invention, as seen in FIG. 11, not only has, just before concrete pouring, accommodated multi-axis precision adjustments as described, but, as seen in FIG. 13, and notwithstanding the fact that centerline template 52 has, at this stage, been removed, also permits post-concrete-pouring, final, fine adjustments, if any are deemed necessary, before the poured concrete has solidified and stabilized.

Figure 14:
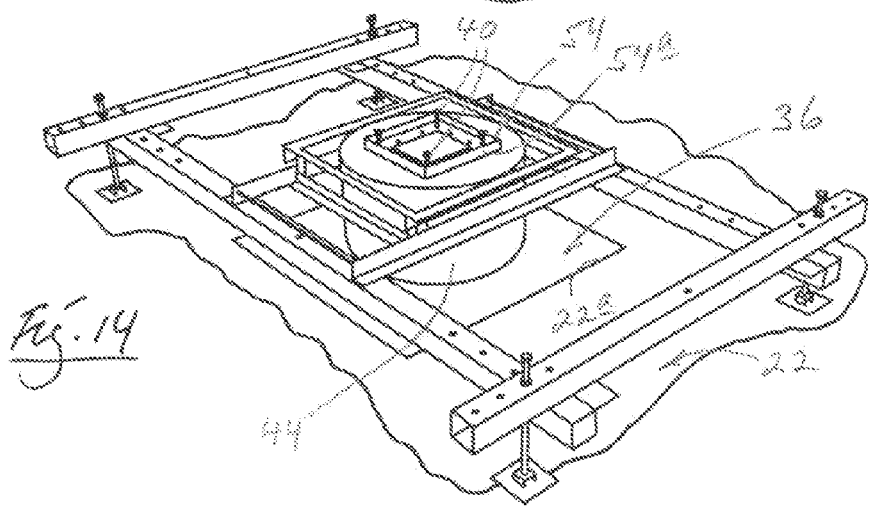

FIG. 14 illustrates that the base-plate template has been removed following concrete pouring, with such removal providing good clearance for surface finishing of the top surface 36a of the cylindrical upper base section of a poured footing. At about this same time, and certainly when the poured concrete has "set" sufficiently, the cylindrical pedestal form 44 is removed. So also now removed, and here see FIG. 15, is pedestal template 48.

Figure 15:
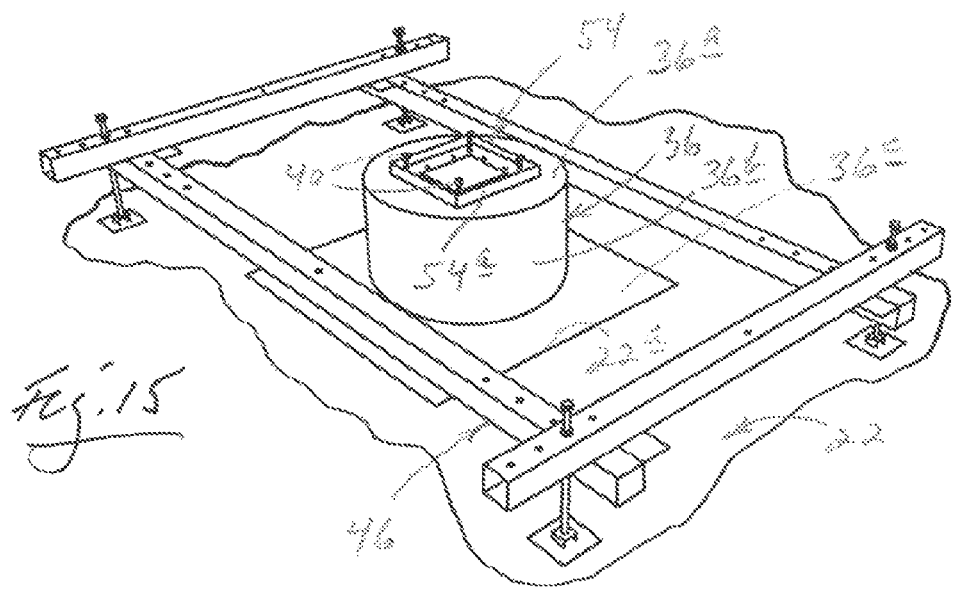
Figure 16:
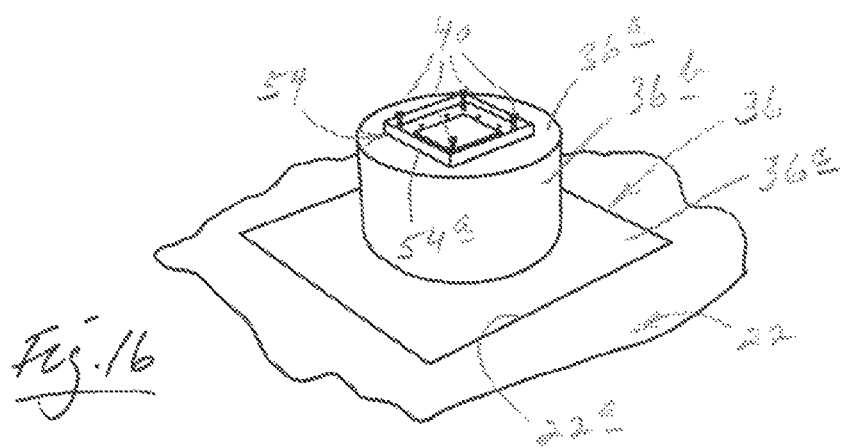
Figure 17:
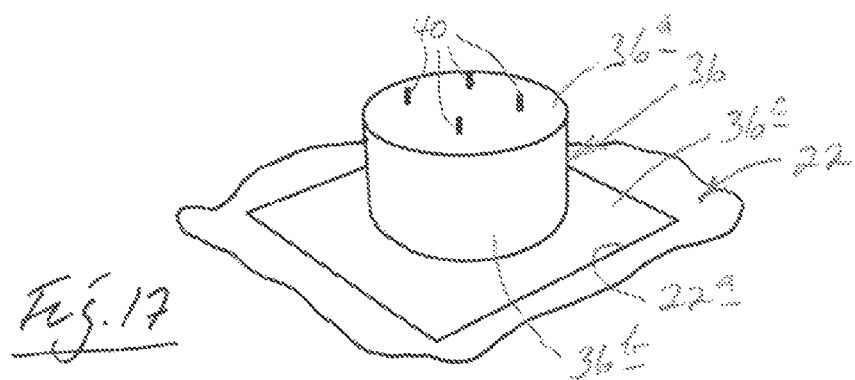

From the conditions shown in FIG. 15, grade template 46 is removed to leave in place what is shown in FIG. 16. And now considering the relationship between conditions shown in FIGS. 16 and 17, the upper, square portion, 54a, in the anchor-bolt template, is removed, to expose, as seen particularly in FIG. 17, upwardly extending portions (above footing surface 36a) of anchor bolts 40.

At this juncture, it is appropriate to direct attention specifically to the distributed-fashion, progressive-stage, fabrication-assistance-sequence illustration presented in FIG. 3, which shows two rows, including six-each ground sites in what may be thought of as matching pairs of footing-fabrication preparation, and finally, ultimate completion, conditions 62, 64, 66, 68, 70, 72. The conditions shown at 62 relate to what is shown in previously discussed FIG. 4. Those shown at 64 and at 66 are alike, and relate to what is pictured in FIG. 5. The two shown at 68 relate to what appears in FIG. 6. The matching conditions shown at 70 relate to what is seen in FIG. 12. The last two site conditions shown at 72 relate to the illustration of FIG. 17.

A preferred and best-mode embodiment of the invention has thus now been fully described in relation to associated drawing illustrations. The form-template system of the invention clearly offers decided advantages in the precision fabrications of column-support footings, and especially in the precision fabrications, alignments, and spatial dispositions of such footings in an array, such as illustrated array 24. The template components of the invention are relatively simple and inexpensive; they are very easily and intuitively employable; and their "vertical openness" readily accommodates easy, unobstructed concrete pouring.

Useful variations and modifications are certainly possible which will come to the minds of those skilled in the relevant art, and accordingly, all such variations and modifications are expected to be treated as coming within the scope and spirit of the invention.

We claim:

1. A precision fabrication form system for assisting in preparing a poured-concrete with upwardly projecting anchor bolts footing for anchorably supporting the base of an elongate, upright, structural-frame column, said system comprising a stackable plurality of fabrication-form templates, assembleable above a prepared ground excavation into which concrete pouring to be associated with such a footing is to occur, said templates being adjustable relative to one another in both pre-pour and post-pour conditions to accommodate staged, precision, X-axis, Y-axis, Z-axis, and pitch, roll and yaw axes dispositions for the concrete and anchor bolts in such a footing, wherein said form templates include (a) a grade template restable on the ground immediately above, adjacent, and laterally surrounding such a prepared excavation, defining a generally horizontal support plane, and constructed for selective, independent, X-axis, Y-axis, Z-axis, pitch-axis and roll-axis adjustments relative to the ground and to such a prepared excavation, (b) a pedestal template anchorably supportable in a vertically stacked manner on said grade template's said defined support plane, adapted to receive and support a pedestal pour form, and adjustable independently and selectively along X, Y axes, and about a yaw axis, relative to said grade template, (c) a base-plate template supportable in a vertically stacked manner on said pedestal template, adapted to receive and support, in a vertically stacked manner, an anchor-bolt template, and (d) an anchor-bolt template placeable in a freely vertically received condition relative to said base-plate template.

2. The system of claim 1, wherein said form templates further include a temporary and intermediate-use centerline template which is freely placeable, in a vertically stacked, and removeably nested, condition, on said base-plate template as a removable precursor to placement, relative to the base-plate template, of said anchor-bolt template.

3. A precision, poured-concrete, column-ground-support footing-fabrication form system, for assisting in preparing, at each of a plurality of spaced, column-support ground sites distributed in a predetermined-footprint ground array of such sites, a footing for anchorably supporting the lower end of an elongate, upright, structural-frame column which is to be included in a plural-column, plural-interconnecting-beam, structural frame constructed within the array footprint, wherein each footing includes a concrete base and plural anchor bolts projecting upwardly therefrom, and precision fabrication utilizing the system is enabled via system structure designed to accommodate precision, independent, X, Y, Z, pitch, roll and yaw axes spatial positioning of the base and anchor bolts associated with each such footing, said system, respecting the assisted fabrication of each footing, comprising a stackable plurality of fabrication-form templates, assembleable above a site-prepared ground excavation into which concrete pouring to be associated with such a footing is to occur, said templates being adjustable, in both pre-pour and post-pour conditions, to accommodate staged, precision, X-axis, Y-axis, Z-axis, and pitch, roll and yaw axes dispositions for the concrete base and anchor bolts in such a footing, said templates including (a) a grade template, restable on the ground immediately above, adjacent, and laterally surrounding such a prepared site excavation, defining a generally horizontal support plane, and constructed for selective, independent, X-axis, Y-axis, Z-axis,pitch-axis and roll-axis adjustments relative to the ground and to such a prepared excavation, (b) a pedestal template anchorably supportable in a vertically stacked manner on said grade template's said support plane, adapted to receive and support a pedestal pour form, and adjustable independently and selectively along X, Y axes, and about a yaw axis, relative to said grade template, (c) a base-plate template fixed-positionally supportable in a vertically stacked manner on said pedestal template, adapted to receive and support, in a vertically stacked manner, an anchor-bolt-carrying footing anchor-bolt subframe, and (d) an anchor-bolt template placeable in a freely vertically received condition relative to said base-plate template.

4. The system of claim 3, wherein said form templates further include a temporary and intermediate-use centerline template which freely placeable, in a vertically stacked, and removeably nested, condition, on said base-plate template as a removable precursor to placement, relative to the base-plate template, of said anchor-bolt template.

5. A precision fabrication form system for assisting in preparing a poured-concrete with upwardly-projecting anchor bolts footing for anchorably supporting the base of an elongate, upright, structural-frame column, said system comprising a grade template restable on the ground immediately above, adjacent, and laterally surrounding a prepared footing-ready excavation, defining a generally horizontal support plane, and constructed for selective, independent, X-axis, Y-axis, Z-axis, linear adjustments, and pitch-axis and roll-axis rotation adjustments, relative to the ground and to such a prepared excavation, a pedestal template slidably and anchorably supportable in a vertically stacked manner on said grade template's said defined support plane, adapted to receive and support a pedestal pour form, and adjustable, slidably, independently, and selectively, on said support plane along X and Y axes, and additionally, about a yaw axis, relative to said grade template, a base-plate template supportable in a vertically stacked manner on said pedestal template, adapted to receive and support in a vertically stacked manner, an anchor-bolt template, and an anchor-bolt template placeable in a freely vertically received condition relative to said base-plate template.

6. The system of claim 5, wherein said form templates further include a temporary and intermediate-use centerline template which freely placeable, in a vertically stacked, and removeably nested, condition, on said base-plate template as a removable precursor to placement, relative to the base-plate template, of said anchor-bolt template.

\* \* \* \* \*